(12) United States Patent
Danna et al.

(10) Patent No.: US 6,578,429 B1
(45) Date of Patent: *Jun. 17, 2003

(54) PHYSICAL QUANTITY MEASURING DEVICE

(75) Inventors: Dominick Danna, Syracuse, NY (US); Raymond A. Lia, Auburn, NY (US); John W. Sims, Weedsport, NY (US); Robert L. Vivenzio, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 09/746,424

(22) Filed: Dec. 21, 2000

Related U.S. Application Data

(60) Provisional application No. 60/195,486, filed on Apr. 10, 2000.

(51) Int. Cl.⁷ .................................... G01L 7/04

(52) U.S. Cl. ........................................ 73/732

(58) Field of Search .................. 73/732, 734, 740–742, 73/747, 748; 33/556, 792, 832, 836

(56) References Cited

U.S. PATENT DOCUMENTS

| | | |
|---|---|---|
| 1,106,341 A | 8/1914 | Bristol |
| 1,377,032 A | 5/1921 | Starling et al. |
| 1,409,028 A | 3/1922 | Richter |
| 2,087,494 A | 7/1937 | Annin |
| 2,256,007 A | 9/1941 | Andresen |
| 2,564,669 A | 8/1951 | Brady |
| 2,636,394 A | 4/1953 | Melchior |
| 3,805,618 A | 4/1974 | Csaposs et al. |
| 3,874,242 A | 4/1975 | Csaposs et al. |
| 3,934,479 A * | 1/1976 | Posnansky ................. 73/708 |
| 4,036,061 A | 7/1977 | Speidel |
| 4,040,298 A | 8/1977 | Lee et al. |
| 4,050,314 A | 9/1977 | Longhetto |
| 4,052,899 A | 10/1977 | Longhetto |
| 4,255,970 A | 3/1981 | Van Pottelberg |
| 4,347,744 A | 9/1982 | Buchanan |
| 4,433,579 A | 2/1984 | Horn |
| 4,543,824 A | 10/1985 | Marterer |
| 4,685,336 A | 8/1987 | Lee |
| 5,181,422 A | 1/1993 | Leonard et al. |
| 5,557,049 A | 9/1996 | Ratner |
| 5,753,821 A | 5/1998 | Chou |
| 5,966,829 A | 10/1999 | Lia et al. |
| 6,120,458 A | 9/2000 | Lia et al. |

FOREIGN PATENT DOCUMENTS

| | | |
|---|---|---|
| DE | 0 591 564 A1 | 10/1992 |
| WO | 00/40941 | 7/2000 |

* cited by examiner

Primary Examiner—Hezron Williams
Assistant Examiner—Charlene Dickens
(74) Attorney, Agent, or Firm—Wall Marjama & Bilinski LLP

(57) ABSTRACT

An apparatus for measuring a physical quantity or parameter includes a housing having a supportably mounted shaft member. A first end of the shaft member is placed in proximity with the output of a displacement device which is responsive to a change in the physical quantity. A ribbon spring member is coaxially disposed and wound helically about the supported shaft member, one end of the spring member being attached to the shaft and a remaining end to a supporting structure. Based on a change in the physical quantity, (pressure, velocity, temperature, etc.), the output of the displacement device engages the shaft member, which axially displaces and rotates due to the constraint of the ribbon spring member. The rotation of the shaft member produces a corresponding angular deflection of an attached pointer relative to readable indicia.

29 Claims, 13 Drawing Sheets

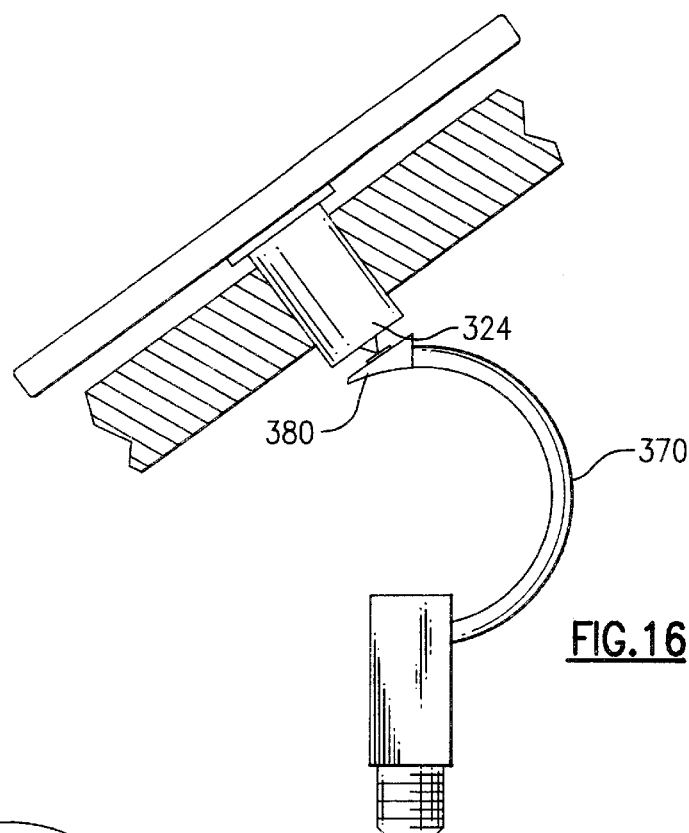
FIG. 16
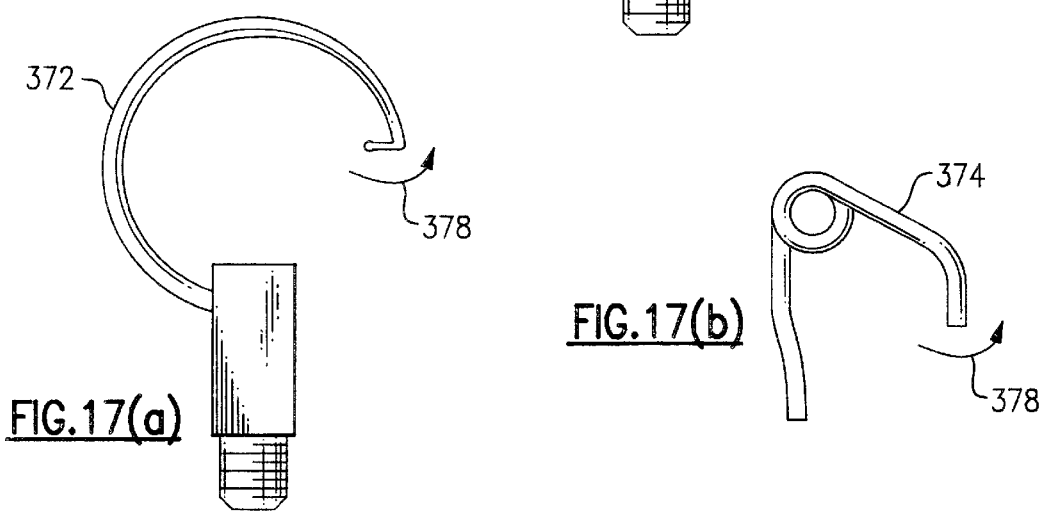
FIG. 17(a)
FIG. 17(b)
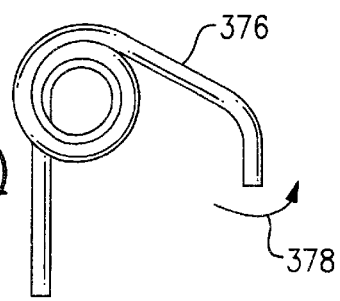
FIG. 17(c)

PHYSICAL QUANTITY MEASURING DEVICE

CROSS REFERENCE TO RELATED APPLICATION

This application claims priority from a provisional application, U.S. Ser. No. 60/195,486, filed Apr. 10, 2000, under 37 CFR §1.53 (b)(2).

FIELD OF THE INVENTION

This invention relates to the field of measuring instruments, and in particular to a movement mechanism used in connection with a measuring instrument which is effectively responsive and which further allows simple and convenient adjustment.

BACKGROUND OF THE INVENTION

Certain measuring devices are known, such as those found in sphygmomanometers (blood pressure cuffs), which include a pneumatic bulb to inflate a pressure chamber of an attached sleeve that is fitted over the arm or leg of a patient. A bellows or diaphragm assembly, responsive to changes in fluid pressure of the pneumatic bulb and the sleeve pressure chamber, is positioned in a dial indicator housing. The pointer of a dial indicator is interconnected to the bellows assembly by a gage mechanism whereby inflation of the bellows causes a corresponding circumferential movement of the pointer.

Typically, these gage mechanisms are quite complex and intricate, and are akin in terms of their manufacture and precision to Swiss watches. For example, in one such mechanism, a pair of diaphragm springs are attached adjacent opposing ends of a spindle. A bottom end of the spindle is placed in contact with the inflatable bellows assembly and a twisted bronze band perpendicularly disposed at the top end of the spindle is connected thereto in parallel by a horizontally disposed bent spring part. As the spindle axially deflects due to the inflation of the bellows assembly, the bent spring part is caused to deflect causing the band to twist. The pointer which is attached to the bronze band is thereby caused to rotate relative to an adjacent dial indicating face.

The above-described mechanisms include a plurality of moving components, each having multiple bearing surfaces. Therefore, such assemblies must be manufactured with a considerable degree of tolerancing to minimize errors, thereby creating a similar level of expense in their manufacture.

In addition, any adjustments required after assembly of such mechanisms, such as to null out the pointer needle or adjust the sensitivity of the device, require substantial teardown or at least significant and undesired disassembly of the measuring device.

SUMMARY OF THE INVENTION

A primary object of the present invention is to improve the state of the art of measuring devices, particularly those devices which are capable of measuring a physical quantity, such as pressure and temperature.

A further object of the present invention is to provide a movement mechanism for a measuring device which is simpler and more inexpensive to manufacture, but which is at least as reliable as previously known mechanisms.

Yet another object of the present invention is to provide a measuring device which is easy to adjust and which does not require teardown of the instrument if and when calibration is required.

Yet another object of the present invention is to provide a movement mechanism which can receive various forms of input so as to allow utilization in a pressure, temperature, displacement or other type of measuring device and simplify the overall design of the device.

Therefore, and according to a preferred aspect of the present invention, there is provided an apparatus for measuring a physical quantity, said apparatus comprising:

a support;

a shaft member disposed in relation to said support, said shaft member having opposing first and second ends with an axis defined therebetween;

displacement means having an output for engaging the first end of said shaft member and moving said shaft member in an axial direction based on a change in the physical quantity; and at least one spring member coaxially positioned relative to said shaft member axis, said at least one spring member being attached at one end to said shaft member and attached at an opposite end to the support, wherein the engagement of the output of displacement means causes said shaft member to translate in said axial direction, said at least one spring member to flex, and said shaft member to rotate.

Preferably, the apparatus includes a dial face having visually perceivable (readable) indicia, the second end of the shaft member having an indicating member attached thereto. Rotation of the shaft member causes a circumferential movement of the indicating member relative to the dial face.

The movement mechanism can therefore be tied to the output of a device which produces movement upon a change in a physical quantity, such as temperature or pressure. Using the above described mechanism, for example, in combination with a Bourdon tube, simplifies manufacture in that het overall length of the tube can be significantly reduced by as much as ⅔, to produce a corresponding circumferential movement of the indicating member.

A movement mechanism for use in connection with a movable output end of a device responsive to changes of at least one physical quantity, said movement comprising:

a support, a shaft member disposed in relation to said support, said shaft member having opposing first and second ends and an axis defined therebetween; and at least one spring member coaxially positioned to said shaft member axis, said at least one spring member being attached at one end to said shaft member and at an opposite end to said support, wherein displacement of the output end of the device causes said shaft member to translate axially, said at least one spring member to flex, and said shaft member to rotate.

A method for measuring at least one physical quantity using a device which includes a movable output end responsive to changes in said physical quantity, said method comprising the steps of:

disposing said movable output end in relation to an axially movable shaft member, said shaft member having a helically wound ribbon spring member wound thereupon, said spring member being constrained at one end to a support and at an opposing end to said shaft member;

moving said output end based on a change in the physical quantity, said output end engaging one end of said shaft member;

translating said axial member based on the amount of movement of said output end;

flexing said spring member based on the translating of said shaft member;

rotating said shaft based on the constraint of said spring; and reading the circumferential movement of an indicating member attached to an opposing end of said shaft member.

An advantage of the present invention is that the described mechanism utilizes a minimum number of bearing surfaces and fewer moving parts than previously known systems. Furthermore, the described mechanism is simpler and more inexpensive to manufacture, yet is as reliable as other known systems.

A further advantage is that the entire mechanism can be fitted in a minimum of space and that any calibration adjustments can be made without requiring an entire tear-down of the mechanism.

Yet another advantage of the present invention is that each of the elements of the described system are coaxially mounted to the shaft, making the system compact and reliable.

Yet another advantage is that the movement mechanism is extremely lightweight when in use of such mechanism in a measuring device, gage, etc., makes the device less susceptible to shock and vibration loads.

These and other objects, features and advantages will be described in greater detail in the following Detailed Description which should be read in conjunction with the accompanying drawings.

BRIEF DESCRIPTION OF THE DRAWINGS

FIG. 16 is a partial side elevational view of a pressure measuring device according to a seventh embodiment of the present invention;

FIGS. 17(a), 17(b), and 17(c), are partial views of Bourdon tubes whose output can be used in conjunction with a measuring device made in accordance with the present invention;

DETAILED DESCRIPTION OF THE INVENTION

Throughout the course of discussion which follows, a number of terms are used to provide a frame of reference with respect to the accompanying drawings. These terms, which include "top", "bottom", "upper", lower", "lateral", etc, are intended, however, only as a frame of reference and are not intended to be limiting of the claims of the present invention.

In addition, each of the following embodiments specifically refers to certain pressure (blood pressure, industrial) as well as other (temperature, displacement) measuring devices. From the following discussion, however, it should be readily apparent to one of ordinary skill in the field that the mechanism according to the present invention can be easily substituted into other blood pressure measuring devices, as well as other measurement devices, such as those for measuring distance, fluid pressure, displacement, force, capacitance, inductance, velocity, and the like.

Figure 1:
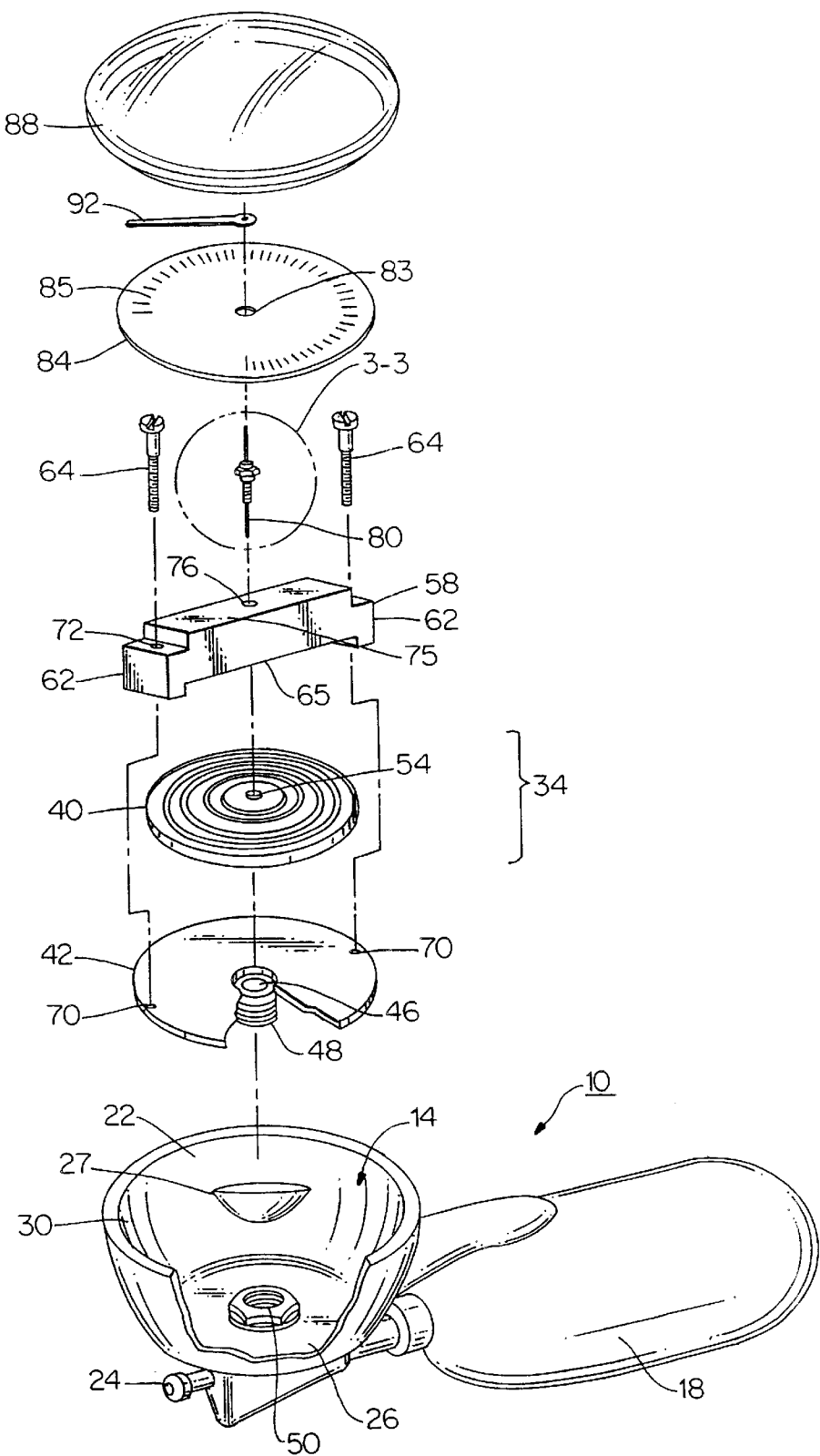
FIG. 1 is an exploded view of a blood pressure measuring device (partially shown) utilizing a mechanism in accordance with a first preferred embodiment of the present invention.

Therefore, and referring to the FIGS., a blood pressure measuring device is partially shown in FIG. 1. The measuring device includes an inflatable sleeve or cuff (not shown) made from a vinyl-coated polyethylene or other suitable material, the sleeve typically including corresponding loop and hook fastener portions on the exterior thereof for variable adjustment of the sleeve onto the arm or leg of a patient. The sleeve is attached through a hose (not shown) and a conduit 24 provided on a housing 10 which is interconnected to an attached pneumatic bulb 18 for providing fluid communication with an inflatable pressure chamber provided in the sleeve in a manner which is well known. That is, the pneumatic bulb 18, when squeezed, provides a source of pressurized fluid (air) for inflating the sleeve's pressure chamber (not shown). The above details such measuring devices are widely known, such as those manufactured by Welch Allyn, Inc., of Skaneateles Falls, N.Y., among others and require no further discussion herein except where applicable to the present invention.

Still referring to FIG. 1, the housing 10 is a compact enclosure having a substantially cylindrical shape including a hollow interior 14 defined by a circumferential inner wall 22, a bottom wall 26, and an open top end 30. The interior 14 is sized for retaining a plurality of components including a bellows assembly 34 comprising a thin cylindrical body 40 made from a flexible material and having a contained inflatable bladder component 38, FIG. 8, which is mounted to one side of a flat circular support plate 42. The support plate 42 includes a center opening 46 which allows fluid communication between the inflatable bladder component 38, the sleeve (not shown) and the pneumatic bulb 18 through attachment of a threaded portion 48 with the internal threads of a port 50 provided on the bottom wall 26 of the housing 10.

A small circular bearing surface 54 is preferably provided at the top of the flexible body 40. Preferably, the top bearing surface 54 is centrally located and made from a hard jeweled material which prevents the distal end 100, FIG. 2, of a vertically extending shaft member 96, FIG. 2, from directly impinging on the bellows assembly 34. According to the preferred embodiment, the surface 54 is made from sapphire, though other suitably hard materials may be used to prevent puncture or damage of the bellows assembly 34, and to minimize rotational friction between the shaft member 96, FIG. 2, and the bellows assembly 34.

A bridge member 58 adjacently disposed in the housing interior 14 supports the bellows assembly 34 in the housing 10. The bridge member 58 is fabricated from a substantially rectangularly shaped and thickened section of aluminum or other suitable material having a pair of opposing lateral ends 62, each end having a through opening 72 aligned with similar openings 70 provided at the outer periphery of the circular support plate 42 for allowing engagement of a screws 64 or other threaded fasteners. The screws 64 are preferably attached from the top side of the bridge member 58 and are secured into the openings 70 of the support plate 42, or alternately to the housing interior 14.

Figures 3, 3A:
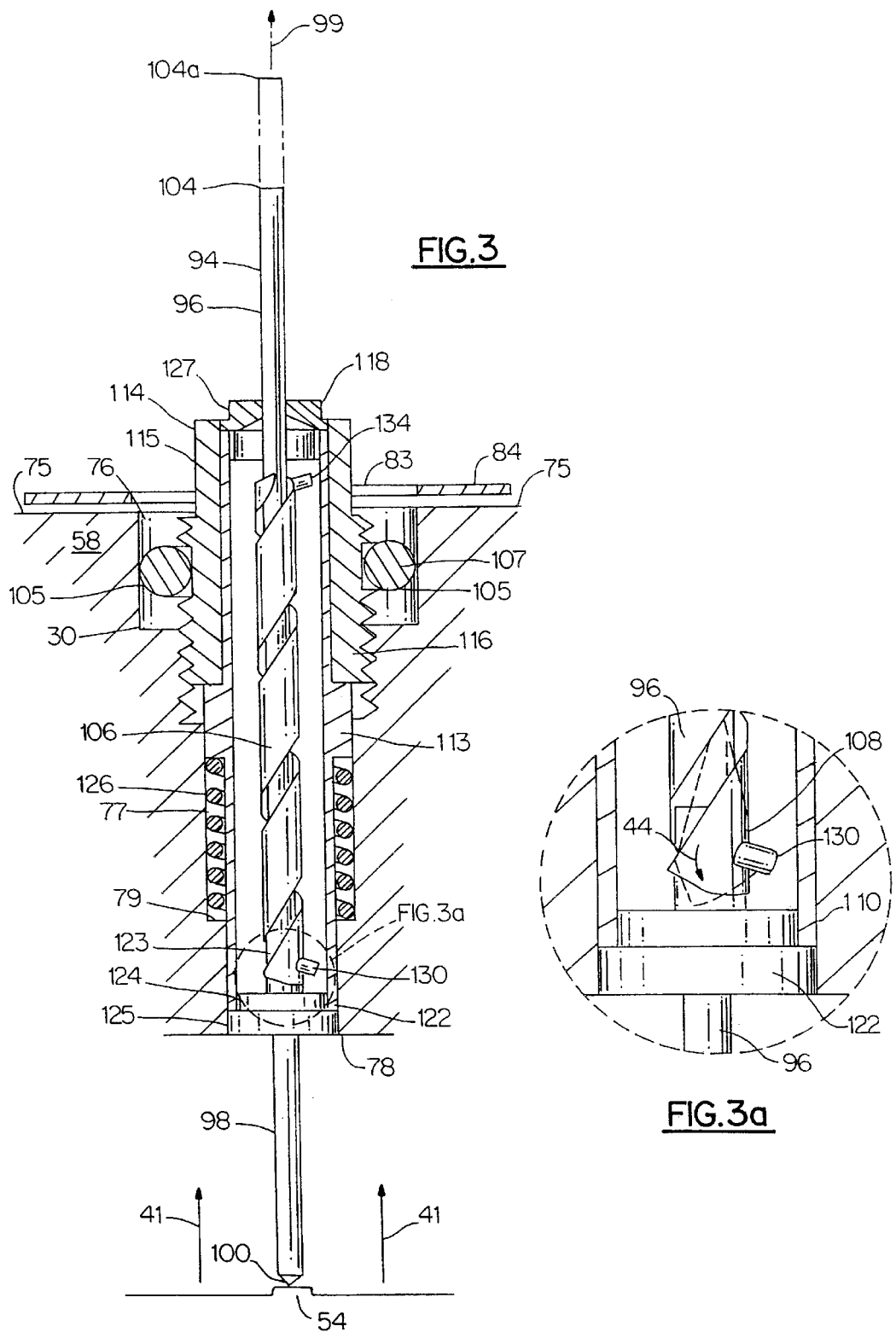
FIG. 3 is the perspective view of the mechanism of FIG. 2, partially in section, as assembled in the measuring device.
FIG. 3(a) is an elevational view of one end of a helical spring member used in the mechanism of FIGS. 2 and 3, illustrating a preferred means of attachment to allow hinging thereof.
Figure 4:
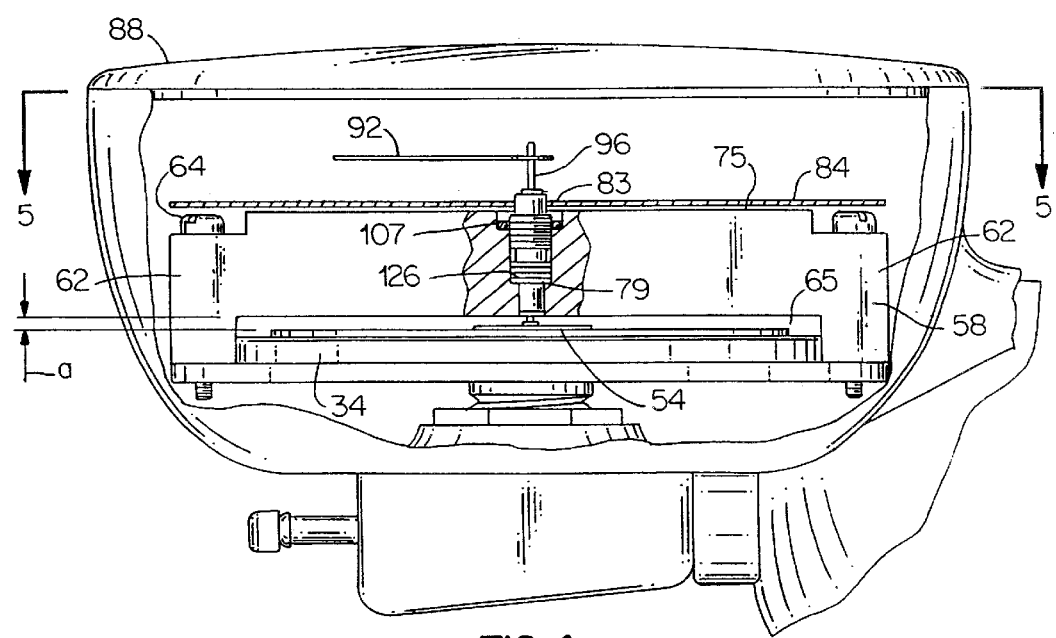
FIG. 4 is an elevational view of the mechanism of FIGS. 1–3 showing the operation of the mechanism in response to inflation of a bellows assembly.
Figure 6:
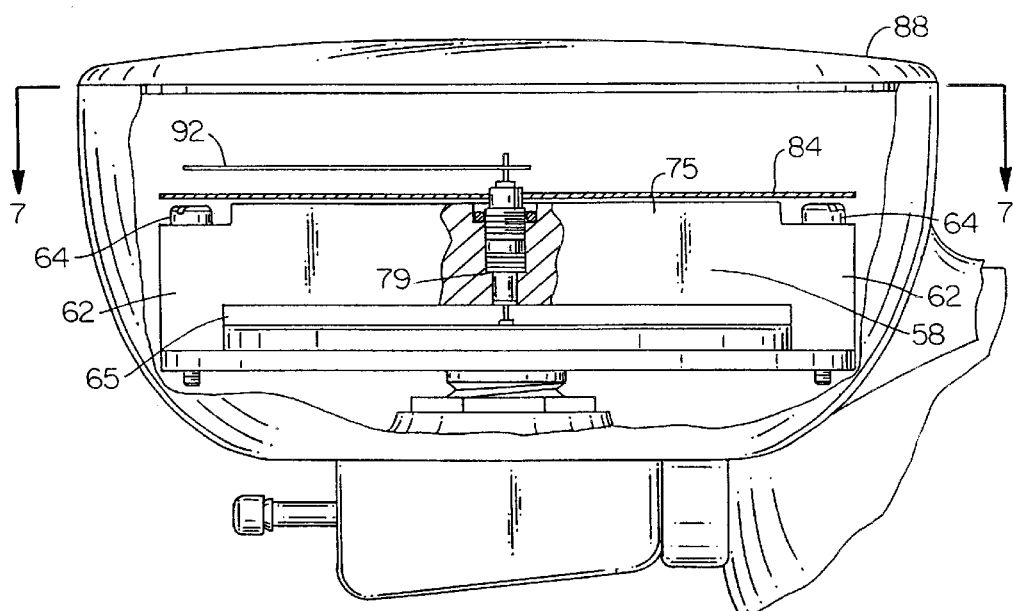
FIG. 6 is the elevational view of FIG. 4 showing the mechanism prior to inflation of the bellows assembly.

The bellows assembly 34 is sandwiched between the top surface of the support plate 42 and the bottom of the bridge member 58, the assembly being maintained in a recess 65 between the lateral ends 62, as most clearly shown in FIGS. 4 and 6. In addition, each of the lateral ends 62 are also recessed at the top of the bridge member 58 such that the heads of the screws 64 do not extend above a top surface 75. A central through opening 76 is coaxially aligned with the top bearing surface 54 of the sandwiched bellows assembly 34 upon assembly. Turning briefly to FIG. 3, the opening 76 includes machined upper and lower portions 77, 78 for accommodating the mechanism 80 of the present embodiment, as described in greater detail below.

Referring to FIGS. 1, 2, 4 and 5, a dial face 84 having a readable indicating portion 85 is supported within the housing 10 at a predetermined distance above the top surface 75 of the assembled bridge member 58 by spaced and circumferentially disposed ridges 27 (only one being shown in FIG. 1) and a glass or clear plastic cover or window 88 is attached by known means to the open top end 30 of the housing 10. A pointer element 92 is integrally crimped or otherwise attached to the top or proximal end 104 of a vertically disposed shaft member 96, extending through the central opening 76 of the bridge member 58 and a dial face opening 83. The pointer element 92 is aligned with the readable indicating portion 85 of the dial face 84 as viewed through the clear window 88. The alignment of the pointer element 92 is more completely described in a later portion of this description.

Figure 2:
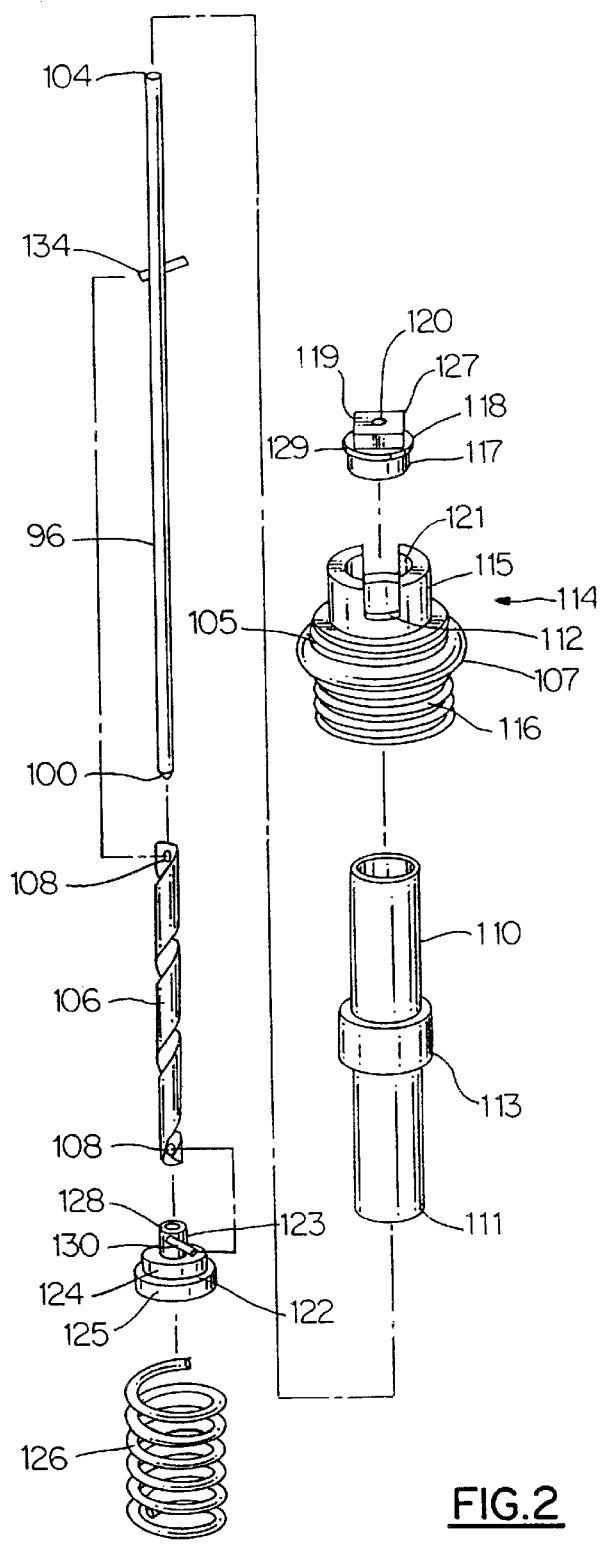
FIG. 2 is an enlarged, exploded perspective view of the mechanism of FIG. 1.

Turning to FIGS. 2 and 3, the mechanism 80 according to the present embodiment includes the above referenced shaft member 96, which according to the invention is an elongate cylindrical body having a distal end 100 and an opposite proximal end 104. According to the present embodiment, the shaft member 96 is made from a hardened 304 stainless steel, though other similar materials may be easily substituted.

A spring member 106 positioned over a portion of the cylindrical shaft member 96 is attached at respective upper and lower ends to the shaft member and a bottom cap member 122. According to this embodiment, the spring member 106 is fabricated from a thin ribbon of beryllium copper which is helically wound into a cylindrical form, such that it possesses this cylindrical form in its free state. Though the above material is particularly useful, it will be readily apparent that other suitable materials similarly formed can be substituted. The spring material is relatively thin, according to this embodiment, and has a suitable width dimension to avoid twisting and potential frictional interference with the shaft member 96 when operated, the operational features being more completely described below.

In terms of specifics, the spring member 106 herein described has a thickness of approximately 0.0005 inches (0.013 mm) in thickness, and is wound into about three helical coils. For the application described, thicknesses in the range of 0.0003–0.0007 inches (0.008–0.018 mm) are acceptable. The thickness and size parameters, of course, will vary with the size of the measuring device and the magnitude of the displacement, among other factors.

A pair of cylindrical pins 134, 130 are provided for engaging attachment holes 108 at respective upper and lower ends of the spring member 106. Each pin 130, 134 is welded or otherwise attached to the exterior of the shaft member 96 and the bottom cap member 122, respectively. According to this embodiment, the pins 130, 134 are fabricated from 304 stainless steel wire and are welded to the exterior of the above components. Preferably, for reasons better articulated below, the attachment holes 108 are oversized in comparison with the diameters of the cylindrical pins 130, 134.

A hollow cylindrical sleeve 110 introduced over the coaxially arranged shaft member 96 and attached spring member 106 includes a bottom end 111 which, during assembly, fits over concentric top and intermediate portions 123, 124 of the bottom cap member 122, the end abutting a similar shoulder portion 125. The intermediate portion 124 has a diameter which allows the bottom cap member 122 to be press fitted into the bottom end 111 of the sleeve 110. An opening 128 passing through each of the concentric portions 123, 124, and 125 of the bottom cap member 122 is sized to accommodate an extending lower portion 98 of the cylindrical shaft member 96.

The sleeve 110 is predominantly a thin-walled tubular section having an external collar or ring portion 113 disposed along a portion of its major longitudinal dimension.

A spring screw 114 having a through opening 121 essentially matching the diameter of the tubular sleeve 110 is fitted over the top thereof, the screw having an externally threaded lower portion 116 and a circular upper portion 115. The threaded lower portion 116 further includes an engagement portion 105 for receiving an O-ring 107 mounted therein. When finally assembled, the bottom of the externally threaded lower portion 116 abuts against a circumferential top edge of the external ring portion 113 of the sleeve 110, and the upper portion 115 extends slightly above the top end thereof. The upper portion 115 also includes a pair of circumferential slots 112, diametrically opposed to one another, which are machined or otherwise cut into the top of the spring screw 114. According to this embodiment, the spring screw 114 and the tubular sleeve 110 are each fabricated from 302 stainless steel.

A cylindrical top cap member 118 (also referred to hereinafter as a zero adjustment member) includes an engagement portion 117 which can be press fitted into the top end of the hollow tubular sleeve 110. An upper portion 127 of the adjustment member 118 includes a depending circular shoulder 129 which abuts the top edge of the sleeve 110 and pairs of oppositely disposed parallel flats 119 which allow engagement by a tool (not shown). The zero adjustment member 118 also includes a through opening 120 sized to accommodate an upper extending section 94 of the cylindrical shaft member 96, the opening preferably being tapered such that the shaft member is contacted only over a short portion adjacent the top of the upper section 127 only. According to an alternate embodiment, (not shown) the zero adjustment member 118 can be also be integrally constructed with the top of the tubular sleeve 110.

A biasing spring 126 is also fitted over the tubular sleeve 110 oppositely from the spring screw 114 relative to the ring portion 113. Referring to FIGS. 3 and 4, one end of the spring 126 is placed in contact with a bottom circumferential edge of the ring section 113, with the remaining end of the spring being in contact with a similarly sized shoulder 79 provided in the center opening 76 of the bridge member 58. The shoulder 79 separates the upper portion 77 of the central opening 76 from the lower portion 78, the upper portion further including a set of internal threads matching those of the threaded lower portion 116 of the spring screw 114.

As is clear from the enlarged sectional view of the assembled mechanism 80 illustrated in FIG. 3, the zero adjustment cap 118, the bottom cap member 122, and the tubular sleeve 110 form an enclosure containing the portion of the cylindrical shaft member 96 having the coaxially attached spring member 106. The formed enclosure is contained within the central opening 76 of the bridge member 58 with the zero adjustment member 118 and part of the upper portion 115 of the spring screw 114 extending from the top surface 75 of the bridge member 58 and extending through the opening 83 of the dial face 84.

Preferably, the above openings 120, 128 in the zero adjustment member 118 and the bottom cap member 122, respectively, do not prevent the shaft member 96 from translating along a vertical direction, or axis, shown as reference numeral 99, FIG. 3.

Referring to FIGS. 3 and 4, when assembled, the shaft member 96 has a length dimension such that the distal end 100 is in substantial contact with the top bearing surface 54 of the bellows assembly 34. The shaft member 96 extends through the coaxial openings 128, 120 provided in the bottom cap member 122 and the zero adjustment member 118. The extending upper portion 94 of the shaft member 96 further extends through the opening 83 provided in the dial face 84 with the pointer element 92, as noted previously, being integrally or securely attached to the proximal end 104 thereof. Preferably, the opening 83 in the dial face 84 is sufficiently large to allow tools (not shown) for adjustment of the mechanism 80, as is now described.

In use, the zero adjustment member 118, the tubular sleeve 110, and the bottom cap member 122 provide a first position adjustment means for calibrating the described mechanism 80 and also for allowing the pointer element 92 to be aligned with a zero or null position on the indicating portion 85 of the dial face 84.

Figure 7:
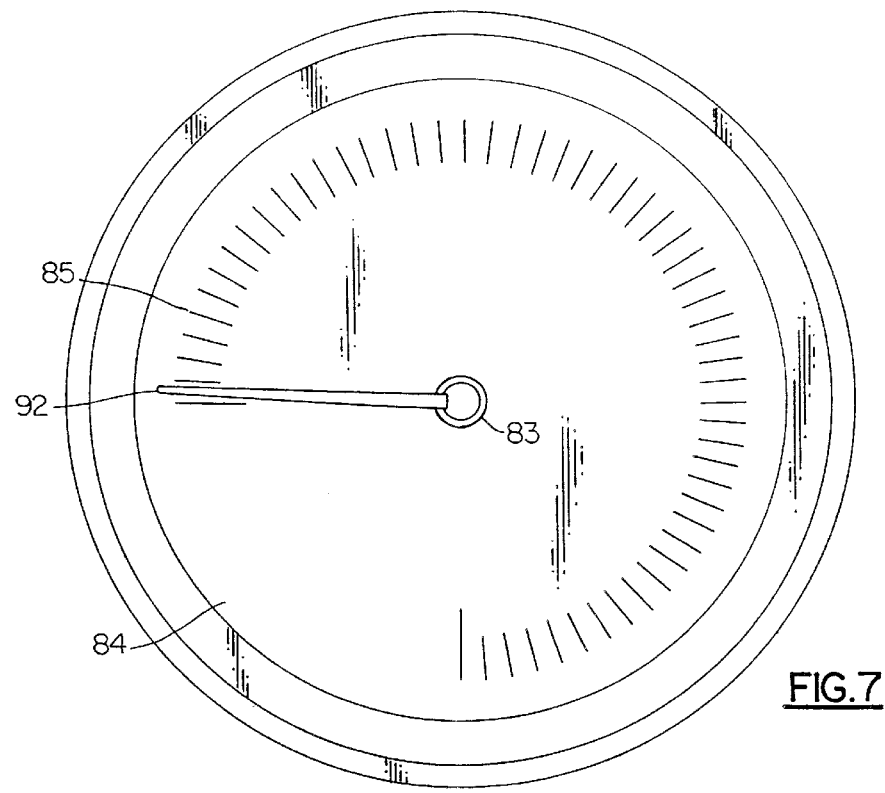
FIG. 7 is a top view of the dial indicator face of the measuring device of FIG. 6.

The zero adjustment member 118, whether integral or separately attached to the tubular sleeve 110, allows the entirety of the shaft member 96 to be rotated about the vertical shaft axis 99 by engagement of a tool with either pair of flats 119. The shaft member 96, being supported through the openings 120, 128 provided in the zero adjustment member 118 nd the bottom cap member 122, is caused to rotate along with the tubular sleeve 110 and the bottom cap member 122. Consequently, both the shaft member 96 and the spring member 106 are caused to rotate along with the attached pointer element 92, allowing the pointer to be initially set, FIG. 7, relative to a null position on the dial face 84.

The present mechanism 80 also includes a second calibrating mechanism which provides for adjustment of the degree of rotation of the shaft member 96 in response to a displacement supplied by the bellows assembly 34. The premise of this calibration is based on controlling the amount of preload placed on the helically wound spring member 106. Turning to FIGS. 2–7, the externally threaded lower portion 116 of the spring screw 114 cooperates with the internal threads shown in FIG. 3, provided in the center opening 76 of the bridge member 58. The slots 112 provided in the adjacent upper section 115 of the spring screw 114 allow engagement with a suitable tool (not shown).

As shown in FIG. 3, a portion of the upper portion 127 of the engaged top cap member 118 and the upper portion 115 of the spring screw 114 extends slightly above the top surface 75 of the bridge member 58 and the dial face 84 to allow engagement without requiring extensive disassembly of the housing 10. Preferably, the dial face opening 83 is sufficiently large to allow access of the tool (not shown) directly to the slotted portion 112 of the spring screw 114 and/or the flat faces 119 of the zero adjustment member 118. By turning the spring screw 114 in a locking (clockwise) direction, the lower end thereof compresses the ring portion 113 of the sleeve 110, causing the entirety of the sleeve to deflect downwardly and to compress the biasing spring 126 against the shoulder 79 within the central opening 76 of the bridge member 58. The downward deflection of the sleeve 110 causes the lower end of the spring member 106, attached to the bottom cap member 122 also to deflect downwardly, thereby preloading the spring member and subsequently increasing the amount of rotational movement of the shaft member, and the pointer member 92 for a predetermined displacement from the bellows assembly 34. The spring member 106 originally has a predetermined axial length which can be varied based on a corresponding rotation of the spring screw 114. Expanding this axial length of the spring member 106 by moving the spring screw 114 downwards tends to increase the amount of rotation for a given axial displacement of the shaft member 96 while moving the spring screw 114 upwards shortens the predetermined axial length and decreases the amount of circumferential movement of the shaft member, and also of the pointer element 92 relative to the dial face 84. The O-ring 107 assists in providing a frictional load such that vibrations do not cause rotation of spring screw 114, such rotation undesirably altering a set axial location of said spring screw.

Figure 8:
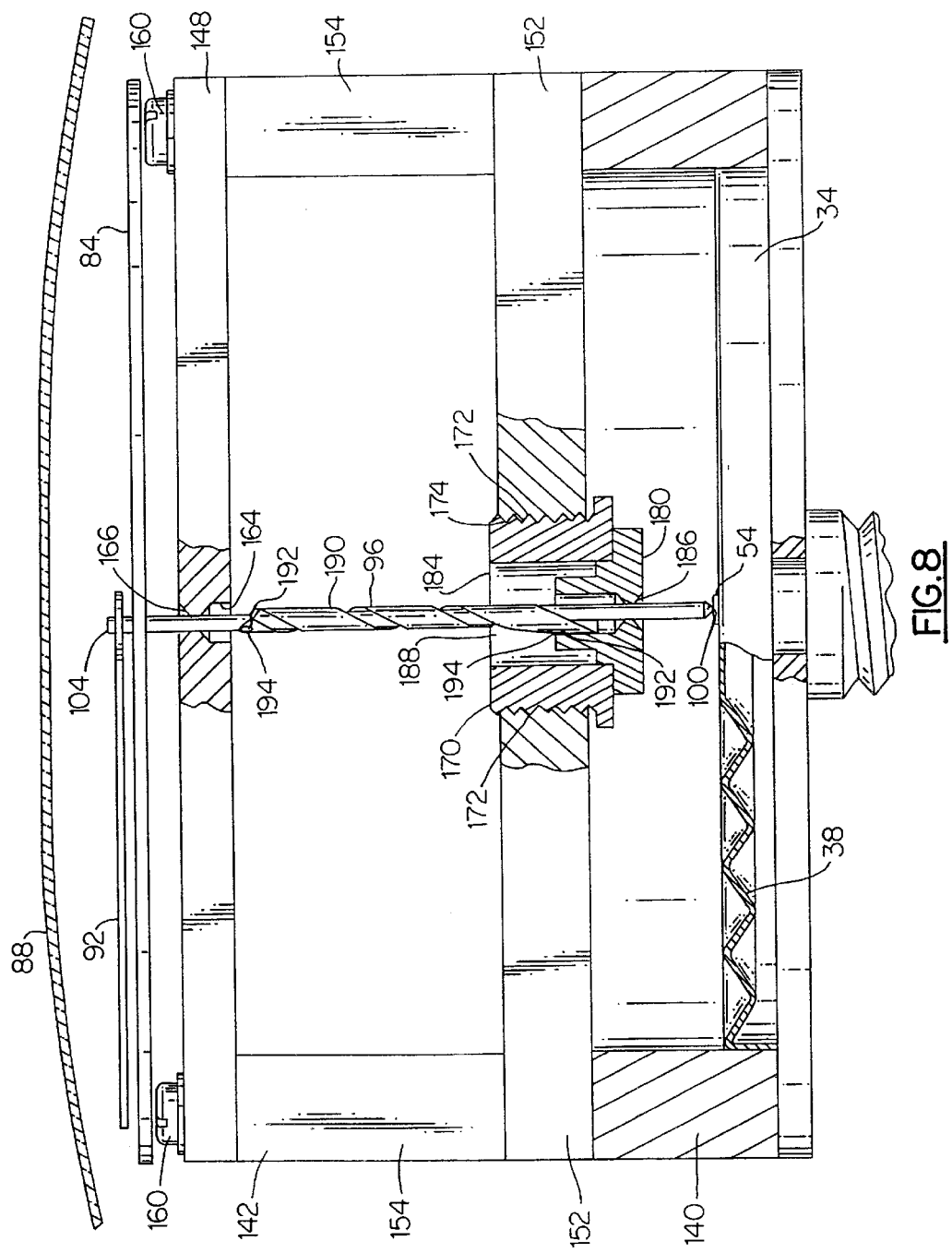
FIG. 8 is an elevational view, partially in section, of a movement mechanism made in accordance with a second embodiment of the present invention.

In operation, the bladder component 38, FIG. 8, is caused to inflate in the direction shown as 41, FIG. 3, in response to pressure changes in the sleeve, (not shown) in a manner commonly known as induced by the pneumatic bulb 18 and patient to which the sleeve (not shown) is attached. The inflation of the bellows assembly 34 causes a vertical displacement of the flexible body 40, FIG. 1, and the top bearing surface 54 impinging on the distal end 100 of the shaft member 96. The shaft member 96, therefore, is urged to translate in the vertical direction 99, as shown in phantom by proximal end 104(a). Due to the constraint supplied by the attachment of the lower end of the spring member 106 to the bottom cap member 122, however, the shaft member 96 is caused to rotate as well as to translate due to the vertical displacement of the inflated bellows in a clockwise direction (as viewed down the axis 99) as the spring member unwinds. The rotation of the shaft member 96 thereby causes the pointer element 92 attached to the proximal end 104 thereof to sweep in a circumferential direction relative to the indicating portion 85 of the dial face 84.

Most preferably, and referring to FIG. 3(a), the attachment of the cylindrical pin 130, with the end hole 108 at one end of the spring member 96, causes the ends of the spring member 96 to pivot or hinge during the motion of the shaft member 96 in the direction indicated by reference numeral 44. The remaining end (not shown) of the spring member 106 is similarly affected. This pivoting minimizes any hysterisis and assures greater linearity.

As noted above, the amount of sweep or circumferential movement of the pointer element 92 can be readily controlled by adjusting the amount of preload of the spring member 106. A resulting change in the amount of preload invariably produces a deviation in the pointer element 92 relative to the dial face 84 which can easily be calibrated against a known pressure load to determine the proper amount of preload. Therefore, a zero calibration should also follow by engaging the flats 119 of the zero adjustment member 118 by a suitable rotation thereof.

In passing, it should be noted that the spring member 106 is also preferably fabricated such that its inner diameter is greater than the diameter of the shaft member 96, even when the spring member has been unwound in the manner described below to prevent frictional interference which could impact repeatability and linearity of the mechanism.

A second embodiment of a movement mechanism according to the present invention is now described with reference to FIG. 8. For the sake of clarity, similar parts are herein labeled with the same reference numerals.

A similar elongate cylindrical shaft member 96 is vertically situated within a housing 140 (only partially shown). A support member 142 includes an upper support portion 148 and a lower support portion 152 spaced by a predetermined distance as defined by cross pieces 154, the supports being interconnected by fasteners 160 inserted through holes (not shown) in a conventional manner. The upper support portion 148 includes a center opening 164 sized to allow the passage of the vertically disposed shaft member 96, the opening also preferably including a circularly tapered bearing surface 166 for impinging point contact thereon.

The lower support portion 152 includes a coaxial, though larger circular opening 174 which accommodates a pair of coaxial adjustment members. A sweep adjustment screw 170 having a cylindrical configuration is sized to fit within the confines of the opening 174, which is preferably threaded to allow engagement by a corresponding set of external threads 172 provided on the exterior of the adjustment member.

A zero adjustment member 180 fits within a center opening 184 of the sweep adjustment screw 170, the zero adjustment member also having a coaxial center opening 188 to allow the passage therethrough of the shaft member 96. The opening 188, like that of the upper support portion 148 also includes a tapered bearing surface 186.

The cylindrical shaft member 96 includes a pair of ends 100, 104. A pointer element 92 is attached or integrally formed at the proximal end 104 and the opposite distal end 100 is positioned in proximity to a bellows assembly 34. Each of the support portions 148, 152 are designed to allow axial movement of the shaft member 96 therethrough.

A thin ribbon-like spring member 190 is helically wound about a substantial portion of the cylindrical shaft member 96 between the upper and lower support portions 148, 152, the spring member being fixedly attached to the shaft member adjacent the upper support portion and to the zero adjustment member 180 adjacent the lower support portion. As in the preceding embodiment, the spring member 190 is fabricated from a thin ribbon of a suitable material such as beryllium copper. The spring member 190 can be attached by welds 194 at either end 192 to the shaft member 96 and to the interior of the zero adjustment member 180, respectively. Alternately, the ends of the spring member 190 can be attached in a manner similar to that described in the preceding embodiment to allow the spring member to hinge or pivot during the axial displacement of the shaft member 96.

The zero adjustment member 180 is sized to retain the shaft member 96 in the opening of the sweep adjustment screw 170 with the circular bottom bearing surface 186 providing point contact against the exterior thereof. The upper support portion 148 includes a similar bearing surface 166 located on the interior of the opening 164 which guides and supports the shaft member 96 for displacement along a predominantly axial path as indicated along the vertical direction 99, FIG. 3.

Operation of the described movement mechanism is as follows. When air pressure is applied to the inside of the inflatable bladder component 38, the top bearing surface 54 bears against the distal end 100 of the shaft member 96, causing the shaft member to translate axially. Since the lower end of the spring member 190 is fixed to the stationary zero adjustment member 180, the spring member is forced to stretch (unwind) in an axial direction. In doing so, the shaft member 96 is also caused to rotate in a clockwise direction, according to this embodiment, and the attached pointer element 92 is circumferentially displaced relative to the indicating portion 85 of the dial face 84.

Adjustment of the zero adjustment member 180 is accomplished by rotation relative to the sweep adjustment screw 170. Turning the zero adjustment member 180 also correspondingly causes the shaft member 96 to rotate about its own axis, allowing the zero circumferential position of the pointer element 92 to be set relative to the indicating portion of the dial face 84.

Rotation of the sweep adjustment screw 170 changes the overall or effective axial length of the spring member 190. The change in the effective axial length of the spring member 190 changes the amount of torsional motion effected by a given axial motion of the shaft member 96. The sweep adjustment screw 170 thereby sets the sensitivity of the pointer element 92 or, in other words, the amount of circumferential pointer motion relative to the dial face 84.

Because using the sweep calibration mechanism also affects the zero position of the pointer element 92, the zero calibration member 180 must be readjusted after a sweep adjustment has been made.

A third embodiment of a pressure measuring device 200 having a movement mechanism according to the present invention is now described with reference to FIG. 9. The device 210 includes a substantially cylindrical housing 212 having an interior cavity 214 defined by a circumferential inner wall 216, an open top end 218, and a bottom end 220. A window or bubble 222, made from glass or any convenient transparent material, is attached in a known manner to the open top end 218 of the housing 212. The bottom end 220 of the housing 212 has a diameter which inwardly tapers down to a narrow downwardly extending portion 224 having a bottom opening 226 serving as a port for admitting a fluid, as described in greater detail below. Preferably, the diameter of the narrow extending portion 224 is about one third that of the major portion of the housing 212, though it will be apparent from the following discussion that this parameter can be suitably varied.

The interior cavity 214 of the housing 212 is sized for retaining a number of component parts, including a support plate 228. The support plate 228 is a generally planar member having opposing top and bottom facing sides 230, 232, as well as a central through opening 234. A press fitted sleeve 236 attached to the top facing side 230 of the support plate 228 extends into the central through opening 234 and is used for retaining a movement mechanism 240, which is described in greater detail below. The circumferential inner wall 216 further includes a reflexed portion 219 which is sized for supporting an outer edge 221 of the support plate 218 immediately therebeneath and at a predetermined height within the housing 212. The central through opening 234 is shown as being substantially aligned with the bottom opening 226 according to this embodiment, but this alignment is not essential.

A diaphragm sub-assembly 242 includes a flexible diaphragm 244 which is non-fixedly attached to the bottom facing side 232 of the support plate 228. The diaphragm 244 is largely horizontally planar and includes a plurality of wave-like surfaces 249. The outer edge 247 of the diaphragm 244 is clamped thereto by an O-ring 246 or other sealing member disposed on a circumferential ledge 245 extending upwardly from the bottom end 220 of the housing 212. The O-ring 246 not only supports the diaphragm 244 in place, but also provides a seal, the function of which is described in greater detail below. According to this embodiment, the centermost portion of the horizontally planar diaphragm 244 is cut or otherwise removed and replaced with a continuous downwardly extending section, hereinafter referred to as the pan 248, which is soldered or otherwise fixed to or integral with the remainder of the diaphragm. The pan 248 is a hollow elongated cylindrical section which extends into the downwardly extending portion 224 of the housing 212 and having a cavity 250 which has a width dimension that is approximately equal to that of the press-fitted sleeve 236. A lower end 253 of the pan 248 includes a hardened or jeweled contact surface 252 on the interior thereof. According to this embodiment, contact surface 252 is sapphire to protect the diaphragm 244.

The movement mechanism 240 according to the present embodiment includes an axially displaceable shaft member 254 which is wholly enclosed within stationary tubular member 256, with the exception of protruding top and bottom ends 253, 255, respectively. A thin flexible ribbon-like spring 270 is fixedly attached at one end 261 adjacent the bottom end of the tubular member 256 and at an opposite remaining end 259 to the axially displaceable shaft member 254 around which the ribbon spring 270 is helically or spirally wound. The outer tubular member 256 includes a set of external threads 273 extending over an upper portion of the length thereof which engage corresponding internal threads 275 provided in the press-fitted sleeve 236. The ribbon-like section 270 is manufactured from beryllium copper, spring steel, or other similar material.

The hollow tubular member 256 includes an integral top cap portion 258 having a diameter which is larger than the remainder of the member, the cap portion having a shoulder 257 which bears against a biasing spring 268 disposed within an annular recess of the press-fitted sleeve 236. The top cap portion 258 and the biasing spring 268 are used to adjust the overall sensitivity of the movement mechanism 240.

When correctly positioned, the majority of the movement mechanism 240 extends beneath the support plate 228 and into the cavity 250 defined in the pan 248 which is already positioned in the downwardly extending portion 224 of the housing 212. In this position, the bottom end 255 of the shaft member 254 is proximate the contact surface 252.

Figure 5:
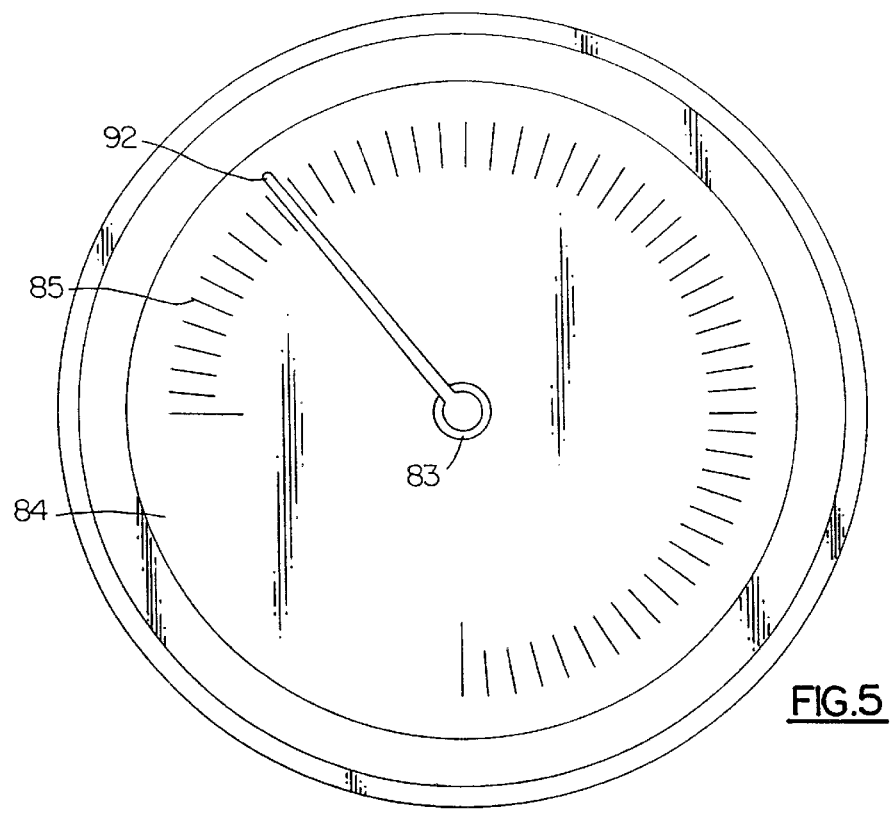
FIG. 5 is a top view of the dial indicator face of the measuring device of FIG. 4.

A dial face 263 having measuring indicia 85, FIG. 5, is attached to the top facing side 230 of the support plate 228 through a center opening which is sized to fit over the press fitted sleeve 236. An O-ring 265 disposed in a slot 267 of the sleeve 236 engages the inner edge of the dial face 263. As in the preceding, an indicating member 262 is mounted to the protruding top end of the shaft member 254.

The indicating member 262 according to this embodiment includes a tapered configuration resulting in a lightweight construction, the member preferably being made from a molded plastic. The indicating member 262 includes a center hub 290 which is releasably mounted to a pin member 282 extending outwardly from the axis of the top end 253 of the axial shaft member 254. Through a keyway 296 provided in a bottom facing surface of the center hub. An indication portion 297 and an anchor or balancing section 298 extend oppositely from the center hub 290, each being tapered and angled downwardly toward the dial face 263. A preferred embodiment of a low mass indicating member is described in greater detail in commonly assigned and pending U.S. Ser. No. 09/471,847, the entire contents of which are incorporated by reference.

In operation, a change in the pressure of incoming fluid (in this example, air) enters the bottom opening 226 of the housing 212 and more particularly the interior cavity of the housing 212. The seal provided onto the outer edge 247 of the diaphragm 244 by the O-ring 246 clamping against the bottom facing side 232 of the support plate 228 prevents air from further penetrating the interior cavity 214. Therefore, the increase in pressure causes axial movement of the pan 248 and the interior contact surface 252 pushes upwardly against the bottom end 255 of the axially displaceable shaft member 254. As a result, the ribbon spring 270 extends against the fixed end 260 of the tubular member 256, causing the shaft member 254 to rotate. The rotation of the shaft member 254 causes a corresponding circumferential movement of the indicating member 262 attached to the top end 253 of the shaft member 234 relative to indicia (not shown) provided on the dial face 263.

Zero adjustment of the above assembly is a relatively simple procedure, as compared with previously known devices. First, the bubble 222 is removed from the open top end 217 of the housing 264. The engagement of the O-ring 265 against the inner edge of the dial face 263 allows the dial face to be freely rotated in relation to the position of the indicating member 262. Sensitivity adjustments can also be made at the top of the assembly by rotating the top cap portion 258 against the biasing spring 258 within the recess 269 of the press fitted sleeve 236, so as to adjust the sensitivity of the ribbon spring 270 for a given rotation. The above adjustments can be made either with the low mass indicating member 262 in place or by removing the member from the pin member 292.

Variations of the above described assembly are possible. For example, and in lieu of the O-ring 265 of FIG. 9, the dial face 263 or the support plate 228 can be suitably tapered adjacent their center openings relative to a slot (not shown) provided in the sleeve 236 in order to allow the dial face to be rotated without requiring removal. Alternately, the movement mechanism 240 can include a zero adjustment feature provided in the lower portion as shown in the preceding embodiments.

Figure 9:
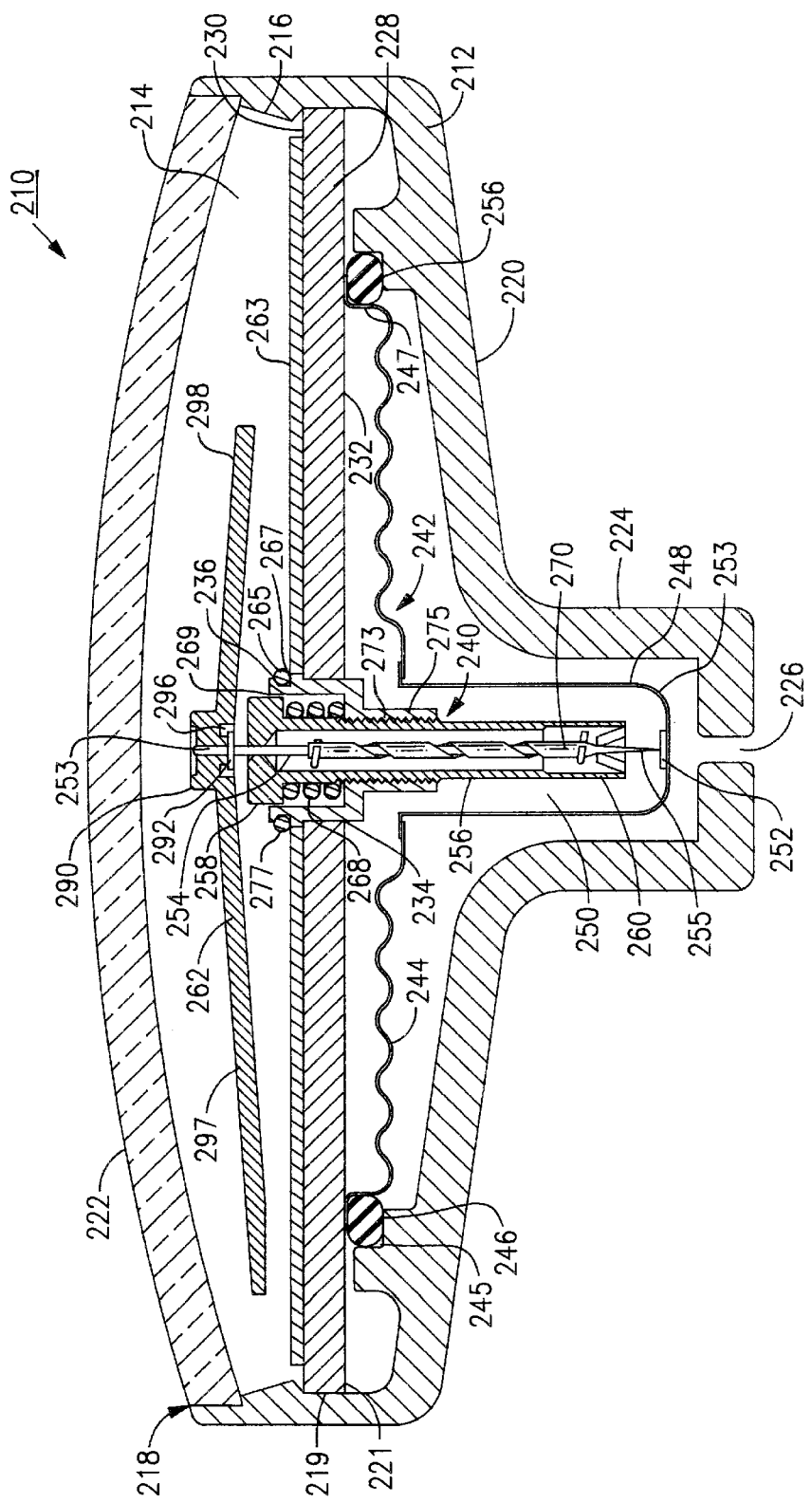
FIG. 9 is a partial side elevational view of a pressure measuring device according to a third embodiment of the present invention.
Figure 10:
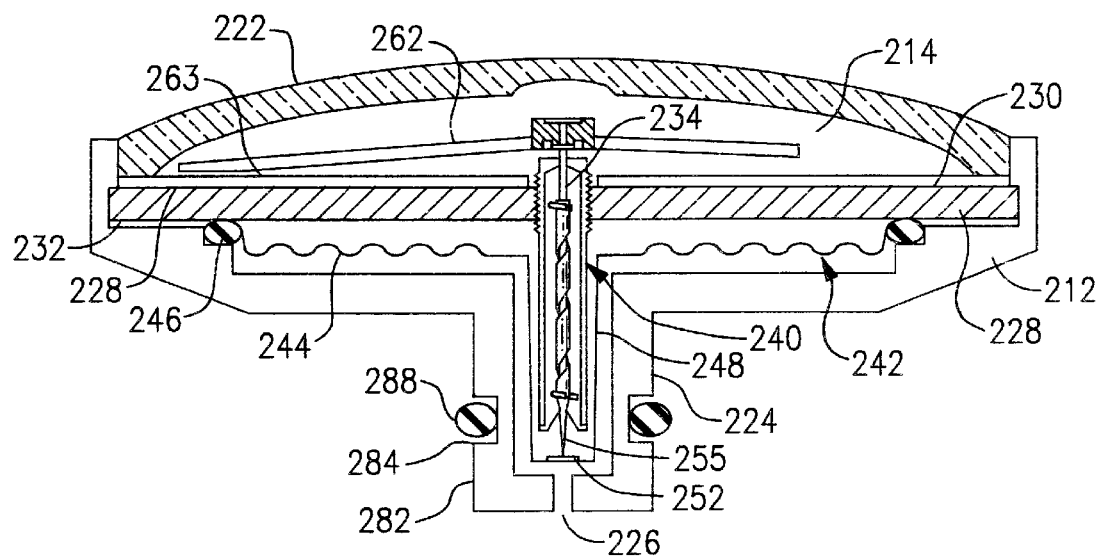
FIG. 10 is a partial side elevational view of a pressure measuring device according to a fourth embodiment of the present invention.

A housing design in accordance with a fourth embodiment is illustrated in FIG. 10. Similar parts used in FIG. 9 are herein labeled with the same reference numerals for the sake of clarity. As in the preceding, the device includes a housing 212 having an interior cavity 214 sized for retaining a diaphragm sub-assembly 242 and a support plate 228, the housing further having a downwardly extending portion 224. A movement mechanism 240 is disposed through an opening in the support plate 228 such that the bottom end 255 of an axially displaceable shaft 234 of the mechanism is disposed in proximity to the contact surface 252 of a downwardly extending portion 248 of the diaphragm. The diaphragm, in the meantime, is attached, and sealed via an O-ring 246 to the bottom facing side 232 of the support plate 228.

Fluid entering through a bottom opening 226 causes deflection of the extending portion 248 of the diaphragm 244 against the axially displaceable shaft 234, thereby causing rotation of the shaft by means of an attached ribbon spring 270, in the manner previously described. Rotation of the shaft 234 produces subsequent circumferential movement of an indicating member 262 in relation to a dial face 263 placed on the top facing side 230 of the support plate 228 which can be seen through a transparent window 222 of the housing 212.

In this embodiment, the device further includes a docking hub 282 provided on the exterior of the downwardly extending portion 224, the hub including a circumferential slot 284 which is sized for retaining an O-ring 228 or other similar sealing element. For example, the docking hub 282 can utilize pipe threads (not shown). The docking hub 282 provides adequate modification to allow the device to be attached to other existing pressure device housings, having pressure sources, or not such as those manufactured by Welch Allyn, Inc., or others. In passing, it should be noted that the position of the bottom opening 226 is not essential; that is, incoming fluid can enter the interior cavity 214 from a horizontally or otherwise disposed port, so long as the opening is beneath the seal provided by the O-ring 228.

In addition, the indicating member 262 is preferably a low-mass plastic member attached to the upper end of the shaft member 234 in the manner provided in U.S. Ser. No. 09/471,847 previously incorporated herein by reference. Further pressure type embodiments allow the docking hub 282 to be mounted directly to a blood pressure cuff, for example, or to existing housings to provide a highly compact low-mass device/assembly.

The preceding embodiments specifically refer to a pressure measuring device, such as those utilized in conjunction with, for example, a blood pressure cuff. In each, a diaphragm, capsule, bellows or similar assembly is required which includes a movable surface or surfaces which deflect when there is a change in fluid pressure. Typically, these movable assemblies tolerate about 15 psi of fluid pressure or less.

Figure 21:
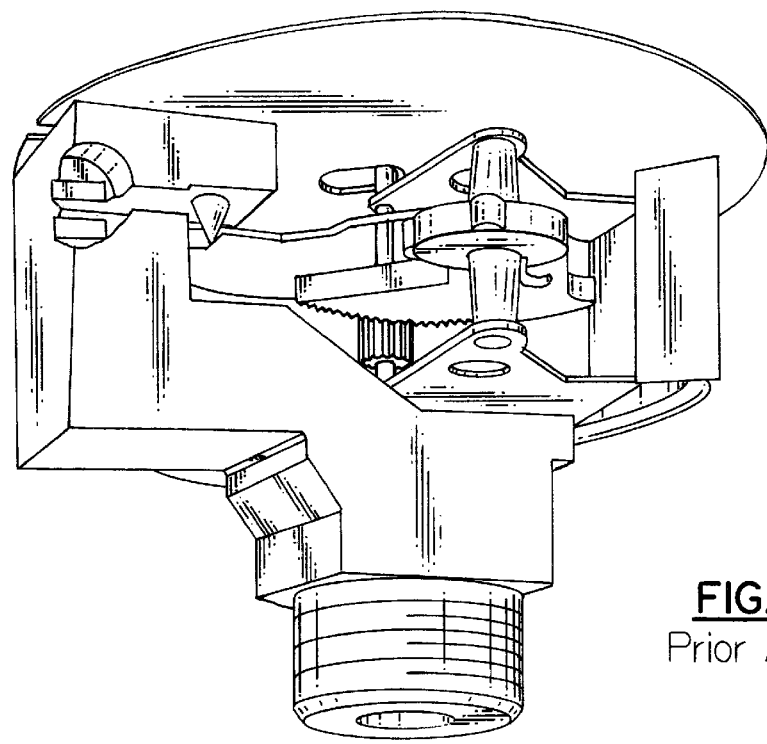
FIGS. 21 and 22 are perspective end bottom views, respectively, of a known Bourdon tube pressure measuring device.
Figure 22:
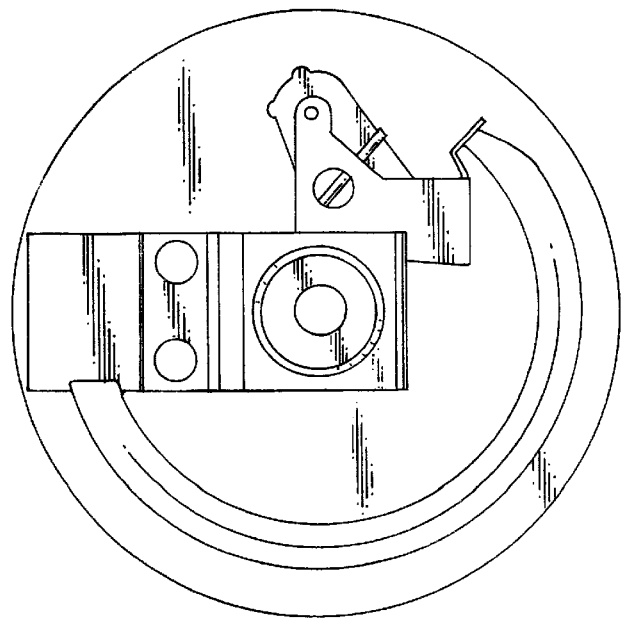

The movement mechanism of the present invention can further be incorporated into industrial-type versions of a pressure or other physical quantity measuring device. Typically, versions of industrial pressure measuring devices include a flexible Bourdon tube, which as commonly known in the prior art, includes a curvilinear elongated or flattened hollow metal cylinder which is fixedly attached to a fitting at one end, the other end of the Bourdon tube being movable in response to a change in pressure in an effort to regain a circular cross section. It is commonly known that Bourdon tubes tolerate greater pressure than diaphragm or bellows type assemblies. Known devices of this type align the movable end of the Bourdon tube with a pointer via a movement mechanism, though the devices used in the known art are relatively complex, such as those shown in FIGS. 21 and 22. As shown, these devices require taking the output of the Bourdon tube and linking this output to a complex movement mechanism, the movement mechanism operating in a manner previously described above. Other similar devices are shown, for example, at pages 56 and 65 of *WIKA-Handbook-Pressure and Temperature Measurement*, U.S. Edition, by Beckerath et al., IPD Printing, Atlanta, Ga. 1998, the entire contents of which are herein incorporated by reference.

Figure 12:
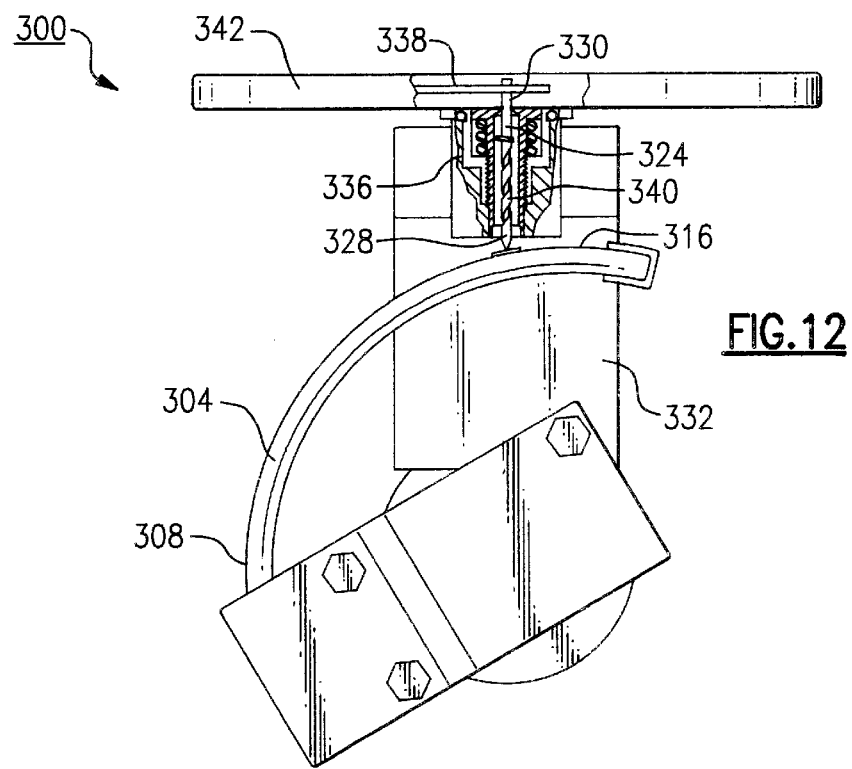
FIG. 12 is a partial side view of the device of FIG. 11, shown partially in section.
Figure 11:
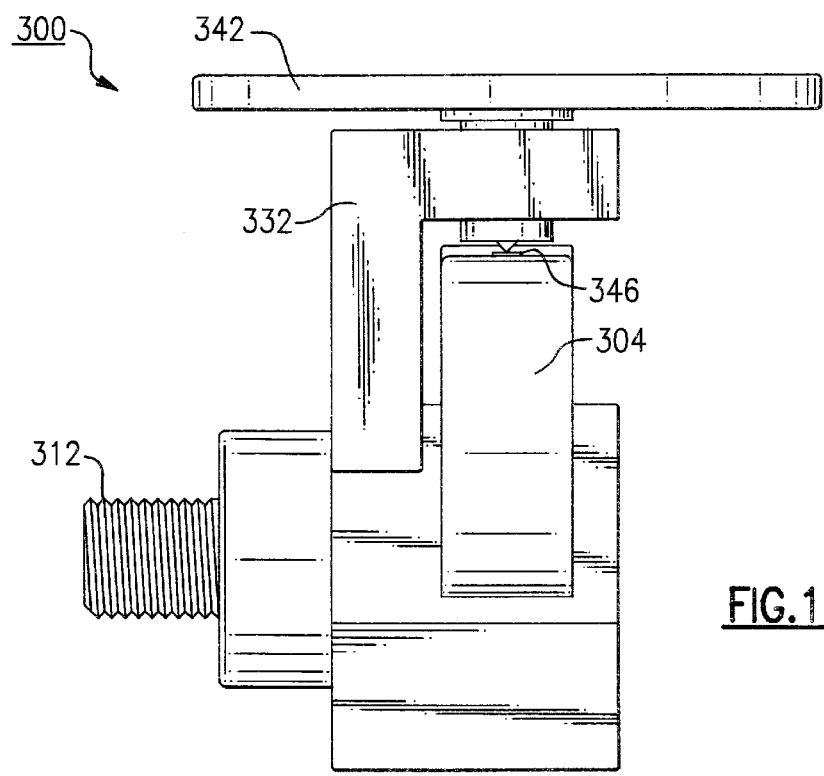
FIG. 11 is a partial end view of a pressure measuring device according to a fifth embodiment of the present invention.

Referring to FIGS. 11 and 12, an industrial type of pressure measuring device 300 in accordance with a fifth embodiment of the present invention is partially shown. Though not fully shown, the device 300 would preferably be fitted within a housing suitably sized for containing the device. The device 300 includes a substantially C-shaped Bourdon tube 304 having a fixed end 308 welded or otherwise fixedly attached to a fitting 312 having pipe threads which receives fluid under pressure from a source (not shown) in a manner commonly known in the field. An opposing movable output end 316 of the Bourdon tube 304 is disposed in relation to a movement mechanism 320, like that previously described with reference to FIG. 9, which includes an axially displaceable shaft member 324 having a bottom or lower end 328 extending downwardly from a bracket 332 retaining the majority of the movement mechanism in a substantially vertical orientation, according to this embodiment.

The axially displaceable shaft member 324 is supported for movement within a tubular support 336 stationarily positioned within the confines of the bracket 332. A helically wound thin ribbon spring 340, made from beryllium copper or the like, is fixedly attached at a lower end thereof to the stationary tubular support 336 and an opposing upper end of the thin ribbon spring is attached to the axially displaceable shaft member 324. Each of the spring ends are preferably attached in the manner described in the first embodiment as more clearly presented in FIGS. 2, 3 and 4 to prevent hysteresis and other non-linear effects.

A low-mass indicating member 338 is attached to an upper end 330 of the axially displaceable shaft member 324, the member preferably being like that shown in FIGS. 9 and 10, and described in greater detail in previously incorporated U.S. Ser. No. 09/471,847. As noted previously, this indicating member 338 includes a lightweight tapered plastic construction and a center hub portion having a keyway to permit releasable attachment to a pin member extending from the upper end of the axially displaceable shaft member 324, the indicating member being disposed in relation to a dial face 342 with indicating indicia, like that previously referred to in preceding embodiments.

Though not shown in detail, the movement mechanism 320 further includes calibration mechanisms disposed at the upper end of the bracket 332 which permit zero adjustment as well as sweep adjustment (tensioning) of the ribbon spring 340 to produce suitable rotational movement for a given deflection of the Bourdon tube 304. These calibration mechanisms were previously described in greater detail in FIG. 9 herein and are similarly suitable for use in the described field of use.

In operation, a change in fluid pressure form the fitting 312 causes an outward radial movement of the output end 316 of the Bourdon tube 304 such that the exterior surface 318 directly engages the extending bottom and 328 of the axially displaceable shaft member 324 and, causing a corresponding upward movement of the shaft member. The constraint of the helically wound ribbon spring 340 with the stationary tubular support 336 produces rotational movement of the shaft member 324 along with the axial translation thereof. This rotational movement thereby produces a circumferential movement of the indicating member 338 in relation to indicating indicia (not shown) of the dial face 342. As noted, an initial or "zero" position of the indicating member 338 can be set in the manner previously described with reference to FIG. 9 to set the indicating member 338 and to properly tension the ribbon spring 340 to produce coordinated movement based on a corresponding pressure load. Preferably, at least a portion of the exterior surface 318 of the movable output end 316 of the Bourdon tube 304 is hardened, such as by defining a sapphire surface 346, to protect the Bourdon tube against repeated contact with the tapered end of the axially displaceable shaft member 324 and increase the life thereof without damage.

Figure 13:
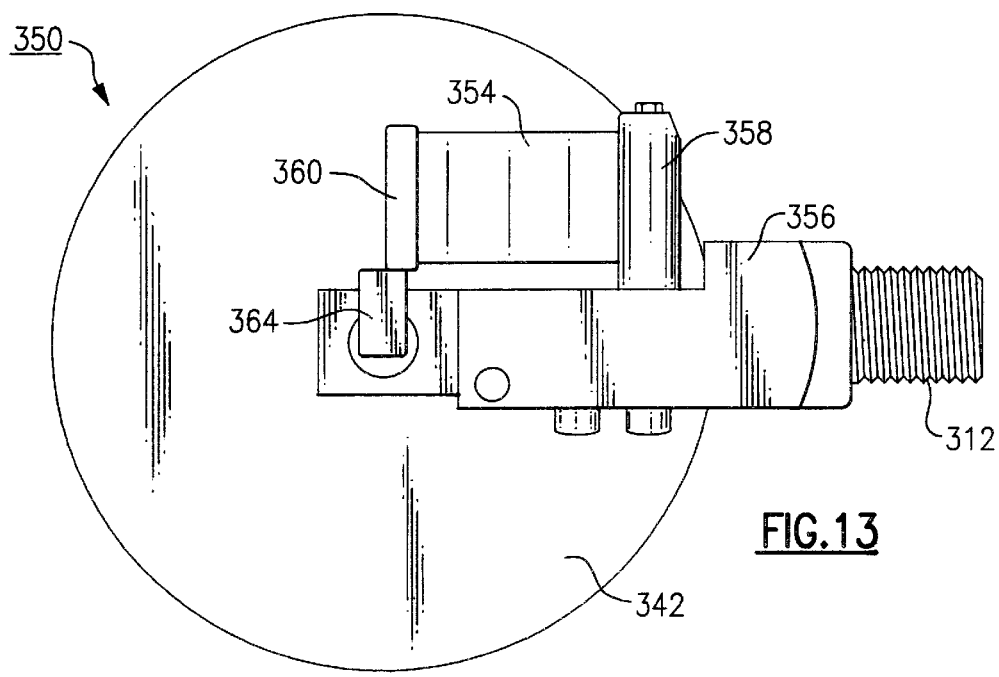
FIG. 13 is a bottom view of a pressure measuring device according to a sixth embodiment of the present invention.
Figure 14:
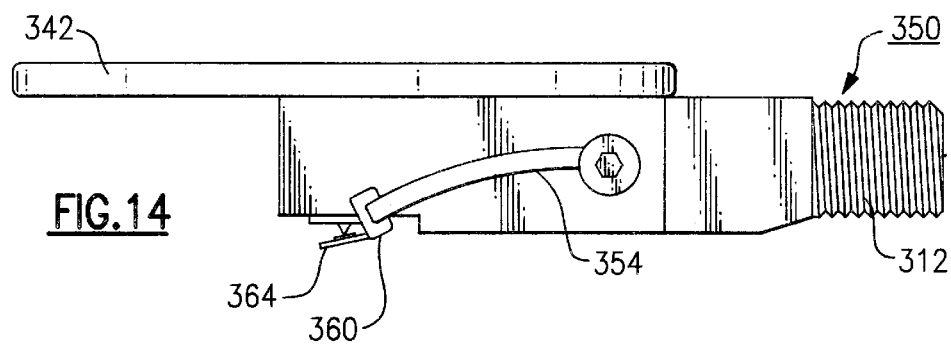
FIG. 14 is a partial side elevational view of the device of FIG. 13.
Figure 15:
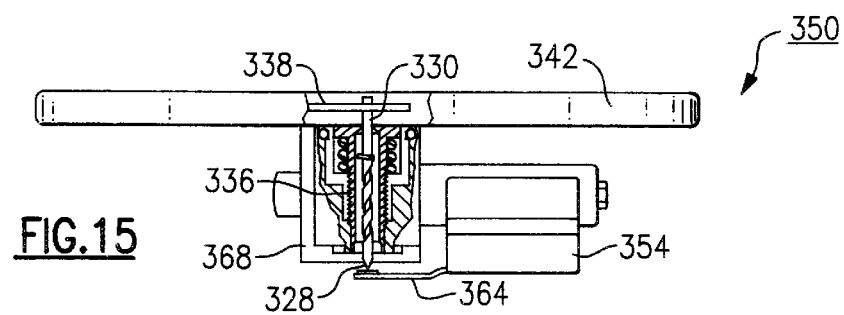
FIG. 15 is a partial end elevational view, partially in section of the pressure measuring device of FIG. 14.

A sixth embodiment of a pressure measuring device 350 according to the present invention is herein described with reference to FIGS. 13–15. Similar parts used in FIG. 11 and 12 are used herein for the sake of clarity, the device 350 only being partially shown to emphasize the inventive concepts.

In the preceding embodiment of FIGS. 11 and 12, a Bourdon tube 304 was mounted such that the exterior surface 318 of the movable output end 316 directly impinged upon the axially disposed movement mechanism 320, in a substantially vertical plane e.g., substantially perpendicular to the axis of the shaft member. In the present embodiment of FIGS. 13–15, a modified Bourdon tube 354 is side-mounted (that is, it is mounted in a horizontal or orthogonal plane to that of FIGS. 11 and 12) with a fixed input end 358 welded or otherwise hard mounted to a fitting 356 and an output end 360 having an extending portion 364 cantilevered therefrom and disposed in direct relation or proximity to the bottom end 328 of an axially displaceable shaft member 324 of a movement mechanism 320 retained within a bracket 368. As in the preceding, the movement mechanism 320 includes a ribbon spring 340 helically wound about a substantial portion of the axially displaceable shaft member 324, one end of the spring being attached to the shaft member and the remaining end being attached to a stationary tubular support 336.

In general, and an essential feature using the movement mechanism 320 in lieu of other known mechanisms is that the overall length of the Bourdon tube 354 can be significantly reduced given that the amount of rotational movement required is far less (about ≈0.050 inches to achieve same travel as 0.125 inches in known devices). Therefore, about ⅔ of the overall length of the tube can be removed without impacting performance.

The cantilevered extending portion 364 is preferably welded to the output end 360 of the shortened Bourdon tube 354 and is angled or twisted with respect to the path of travel of the output end so as to substantially (e.g. directly) contact the bottom end 328 of the axially displaceable shaft member 324. Like the preceding, the extending portion 364 includes a hardened contact surface 368 to increase the useful life of the measuring device 350.

Similarly, the movement mechanism 320 preferably includes a low mass indicating member 338, as previously described, which is releasably attached to the projecting upper end of the shaft member in relation to a dial face as well as calibration mechanisms to properly zero the indicating member and to adjust the sweep of the indicating member with respect to the tension of the ribbon spring for a pressure load (corresponding movement of the output end 360 of the Bourdon tube 354).

The combination of the present movement mechanism 320 and the shortened Bourdon tube 354 provides a pressure measuring device which is extremely compact due to its lower profile, with the Bourdon tube not adding to the overall height of the device. In addition, the extreme low mass of the movement mechanism 320 produces a lightweight assembly which is highly resistant to shock or impact loads. That is, the device can be dropped from a height encountered in typical or normal use (~6 feet) without significant damage to the device. Moreover, and in terms of an industrial environment, the presently described measuring device 350 can withstand direct vibrational loads with little effect on the dial output as opposed to known devices, such as those previously referred to above, whose indicating members display considerably more fluctuation from a measured reading when a vibrational load is applied.

It is noted that other types of Bourdon-tubes, other than the C-shaped forms previously described, can be used in conjunction with a movement mechanism 320, FIG. 12, including, but not limited to other C-shaped types, helical types, and spiral types, such as those schematically shown in FIGS. 17(a)–17(c). Each of the depicted Bourdon tubes 372, 374, 376, similarly include output ends whose deflection, as shown by arrow 378, can be applied directly or indirectly to the present movement mechanism. FIG. 16 further depicts another C-shaped Bourdon tube 370 whose output, for example, can be directly applied to an obliquely arranged movement mechanism 324 using a wedge 380. Other variations are possible.

In passing, it should be noted that vacuum gauges using Bourdon tubes operate in a similar manner to produce readings on a dial indicator. In these instances, the present movement mechanism, such as that shown as 320, for example can be attached or otherwise receive the suitable input in a similar manner from a movable output end of the Bourdon tube.

Figure 18:
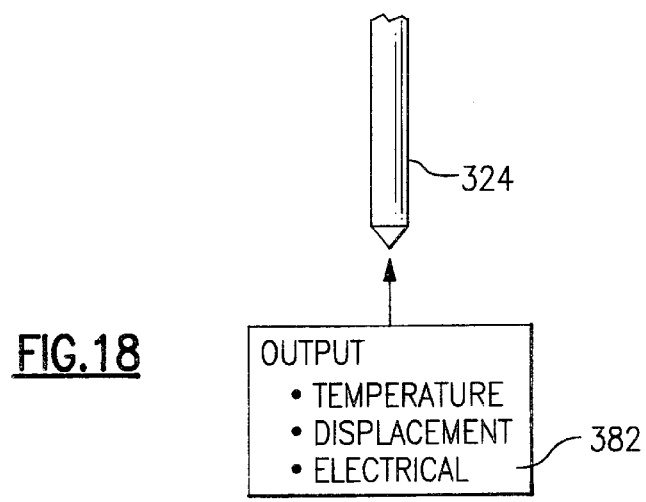
FIG. 18 is a schematic diagram indicating multiple forms of output which can be tied to a movement mechanism in accordance with the present invention.

FIG. 18 illustrates that other forms of physical quantities, in addition to pressure, shown collectively as 382, which can be applied to the present movement mechanism to indicate a resulting change. Literally, any output which can translate the axially displaceable shaft member 324 of the movement mechanism described herein is suitable including capacitance, electrical or magnetic fields, induction, temperature, velocity, humidity and force being among those whose effect can be measured.

Figure 19:
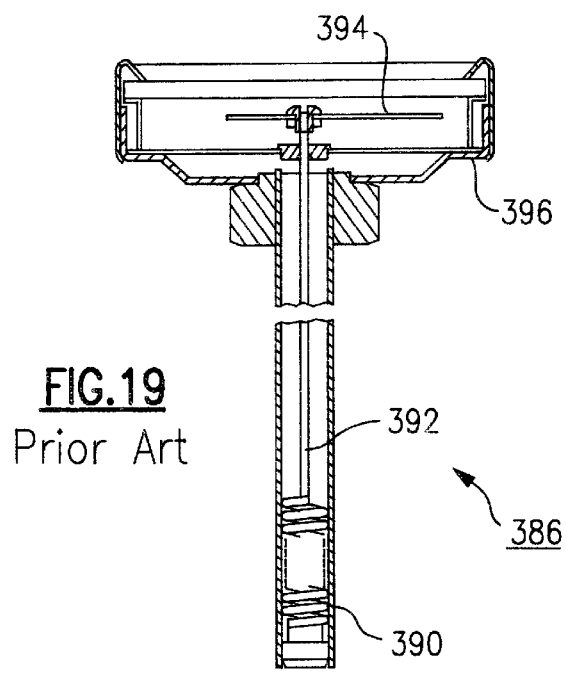
FIG. 19 is a side elevational view shown in section of a prior art bimetallic spring controlled temperature gauge.

For example, and referring to FIG. 19, a prior art temperature gauge 386 includes an elongated housing 388 containing a bimetallic spring 390 made from at least two materials having differing thermal expansion characteristics. As a thermal change is detected, the output of the bimetallic spring 390 causes rotation of a shaft member 392 and corresponding movement of an indicator member 394.

Figure 20:
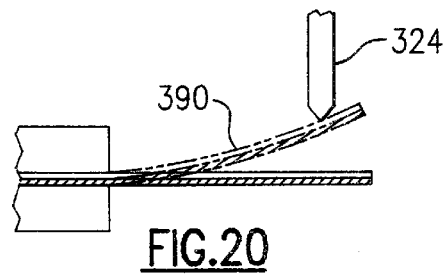
FIG. 20 is an enlarged view of the bimetallic spring of the prior art device of FIG. 19 used in combination with a movement mechanism of the present invention.

With the preceding background, and referring to FIG. 20, the output end of the bimetallic spring 390 can be disposed in relation to the end of an axially displaceable shaft member 324 of a movement mechanism 320, as previously described. Other variations for use of the movement mechanism are possible, including similar use with devices including, but not limited to piezoelectric actuators, strain gauges, hall effect sensors, capacitive sensors, potentiometric sensors, inductive sensors, temperature scales, force gauges, electrical gauges, electrical temperature sensors, pyrometers, spring thermometers, and the like including those described in the previously incorporated WIKA manual. In addition, more than one physical quantity charge can be detected such as the combination of temperature and wind velocity (wind chill) and temperature and humidity (heat index), among others.

| PARTS LIST FOR FIGS. 1–22 | |
|---|---|
| 10 | housing |
| 14 | hollow interior |
| 18 | pneumatic bulb |
| 22 | circumferential inner wall |
| 24 | conduit |
| 26 | bottom wall |
| 27 | circumferential ridge |
| 30 | open top end |
| 34 | bellows assembly |
| 38 | inflatable bladder component |
| 40 | flexible body |
| 41 | direction |
| 42 | support plate |
| 44 | hinge direction |
| 46 | center opening |
| 48 | threaded portion |
| 50 | port |
| 54 | top bearing surface |
| 58 | bridge member |
| 62 | lateral ends |
| 64 | screws |
| 65 | recess |
| 70 | opening |
| 72 | opening |
| 75 | top surface |
| 76 | opening |
| 77 | upper portion |
| 78 | lower portion |
| 79 | shoulder |
| 80 | gage mechanism |
| 83 | opening |
| 84 | dial face |
| 85 | indicating portion |
| 88 | window |
| 92 | pointer element |
| 94 | upper extending portion |
| 96 | shaft member |
| 98 | lower extending portion |
| 99 | vertical direction |
| 100 | distal end |
| 104 | proximal end |
| 106 | spring member |
| 108 | attachment holes |
| 110 | sleeve |
| 111 | bottom end |
| 112 | slots |
| 113 | ring section |
| 114 | spring screw |
| 115 | upper portion |
| 116 | threaded lower portion |
| 117 | engagement portion |
| 118 | top cap member (zero adjustment member) |
| 119 | flats |
| 120 | center opening |
| 121 | through opening |
| 122 | bottom cap member |
| 123 | top section |
| 124 | intermediate section |
| 125 | bottom shoulder section |
| 126 | biasing spring |
| 128 | opening |
| 129 | shoulder |
| 130 | cylindrical pin |
| 134 | cylindrical pin |
| 140 | housing |
| 142 | support member |
| 148 | upper support portion |
| 152 | lower support portion |
| 154 | cross pieces |
| 160 | fasteners |
| 164 | opening |
| 166 | bearing contact surfaces |
| 170 | sweep adjustment screw |
| 174 | opening |
| 178 | threaded portion |
| 180 | zero adjustment member |
| 184 | opening |
| 186 | bearing contact surfaces |
| 188 | opening |
| 190 | spring member |
| 192 | end |
| 194 | weld |
| 210 | device |
| 212 | housing |
| 214 | interior cavity |
| 216 | circumferential inner wall |
| 218 | open top end |
| 219 | reflexed portion |
| 220 | bottom wall |
| 221 | outer edge -support plate |
| 222 | bubble |
| 224 | downwardly extending portion |
| 226 | bottom opening |
| 228 | support plate |
| 230 | top facing side |
| 232 | bottom facing side |
| 234 | central through opening |
| 236 | sleeve |
| 240 | movement mechanism |
| 242 | diaphragm subassembly |
| 244 | diaphragm |
| 245 | circumferential ledge |
| 246 | O-ring |
| 247 | outer edge |
| 248 | pan |
| 249 | wave-like surfaces |
| 250 | cavity |
| 252 | contact surface |
| 253 | top end |
| 254 | shaft |
| 255 | bottom end |
| 256 | tubular member |
| 257 | shoulder |
| 258 | top cap portion |
| 259 | end -ribbon spring |
| 260 | bottom end |
| 261 | end -ribbon spring |
| 262 | indication member |
| 263 | dial face |
| 264 | outer tubular shell |
| 265 | O-ring |
| 266 | threads |
| 267 | slot |
| 268 | biasing spring |
| 269 | recess |
| 270 | ribbon spring member |
| 272 | one end |
| 273 | threads |
| 275 | threads |
| 280 | slots |
| 282 | docking hub |
| 284 | slot |
| 286 | end |
| 288 | O-ring |
| 290 | center hug |
| 292 | pin member |

-continued

PARTS LIST FOR FIGS. 1–22

| | |
|---|---|
| 296 | keyway |
| 300 | pressure measuring device |
| 304 | Bourdon tube |
| 308 | input end |
| 312 | fitting |
| 316 | output end |
| 318 | exterior surface |
| 320 | movement mechanism |
| 324 | axially displaceable shaft member |
| 328 | bottom end |
| 330 | upper end |
| 332 | bracket |
| 336 | tubular support |
| 338 | indicating member |
| 340 | ribbon spring |
| 342 | dial face |
| 346 | hardened sapphire surface |
| 350 | device |
| 354 | Bourdon tube |
| 356 | fitting |
| 358 | input end |
| 360 | output end |
| 364 | extending portion |
| 368 | surface hardened |
| 370 | Bourdon tube |
| 372 | Bourdon tube |
| 374 | Bourdon tube |
| 376 | Bourdon tube |
| 378 | arrow |
| 380 | wedge |
| 382 | output |
| 386 | device (thermometer) |
| 388 | dial face |
| 390 | bimetallic spring |
| 392 | shaft member |

Though the present invention has been described in terms of a pair of specific embodiments, it will be appreciated that modifications and variations are possible using the concepts described herein which are within the intended scope of the invention.

We claim:

1. Apparatus for measuring at least one physical quantity, said apparatus comprising:
   a support;
   a shaft member disposed in relation to said support, said shaft member having opposing first and second ends and an axis defined therebetween;
   displacement means having an output for engaging the first end of said shaft member based on a change in at least one physical quantity; and
   at least one spring member coaxially positioned along said shaft member axis, said at least one spring member being attached at one end to said shaft member and attached at an opposite end to said support, wherein the engagement of the output of said displacement means causes said shaft member to translate in said axial direction, said at least one spring member to flex, and said shaft member to rotate.

2. Apparatus as recited in claim 1, including a dial face having readable indicia, the second end of said shaft member having an indicating member attached thereto and in which the rotational movement of said shaft member causes a circumferential movement of said indicating member relative to the readable indicia.

3. Apparatus as recited in claim 1, wherein the physical quantity includes at least one of the group comprising velocity, displacement, pressure, humidity, capacitance, resistance, inductance, force and temperature.

4. Apparatus as recited in claim 1, wherein said displacement means includes a Bourdon tube having a fixed end and an opposing movable end.

5. Apparatus as recited in claim 4, wherein said Bourdon tube is disposed such that the movable end is aligned with the first end of the shaft member.

6. Apparatus as recited in claim 5, wherein said Bourdon tube includes a primary axis extending between the fixed end and the movable end.

7. Apparatus as recited in claim 6, wherein the primary axis of the Bourdon tube extends substantially coaxial with the axis of the shaft member.

8. Apparatus as recited in claim 6, wherein the primary axis of said Bourdon tube extends substantially perpendicularly in relation to the axis of the shaft member.

9. Apparatus as recited in claim 5, wherein the axis of motion of said movable end of said Bourdon tube is substantially coincident with the axis of said shaft member.

10. Apparatus as recited in claim 8, including a cantilevered extending portion attached to the movable end of the Bourdon tube, said extending portion being angled in relation to the path of travel of said movable end so as to be substantially coincident with the axis of said shaft member.

11. Apparatus as recited in claim 5, wherein said Bourdon tube includes an exterior surface, at least a portion of the exterior surface of the movable end including a hardened portion to withstand wear resistance of said shaft member.

12. Apparatus as recited in claim 5, wherein said Bourdon tube is substantially C-shaped.

13. Apparatus as recited in claim 5, wherein said Bourdon tube is substantially spiral shaped.

14. Apparatus as recited in claim 5, wherein said Bourdon tube is substantially helical in shape.

15. Apparatus as recited in claim 2, wherein said displacement means is a Bourdon tube having a fixed end and a movable end defined by a length therebetween, the movable end of said Bourdon tube being disposed in relation to the first end of said shaft member such that movement of the movable end of said Bourdon tube produces a corresponding circumferential movement of said indicating member.

16. Apparatus as recited in claim 15, wherein the engagement of the movable end of said Bourdon tube to the first end of said shaft member permits the overall length of said Bourdon tube to be reduced significantly.

17. Apparatus as recited in claim 16, wherein the overall length of said Bourdon tube can be reduced by at least ⅓ to produce the requisite movement of said indicating member indicative of the change in the physical quantity.

18. Apparatus as recited in claim 1, wherein said displacement means includes a temperature responsive member made from at least two materials having differing thermal expansion characteristics.

19. Apparatus as recited in claim 18, wherein the temperature responsive member is cantilevered, including a free end which is disposed in relation to the first end of said shaft member.

20. Apparatus as recited in claim 18, wherein the temperature responsive member assumes a coiled configuration, said member having a movable end which is disposed in relation to the first end of said shaft member.

21. Apparatus as recited in claim 1, wherein said apparatus is a pressure gauge.

22. Apparatus as recited in claim 1, wherein said apparatus is a pyrometer.

23. Apparatus as recited in claim 1, wherein said apparatus is a strain gauge.

24. Apparatus as recited in claim 1, wherein said apparatus is a thermometer.

25. Apparatus as recited in claim 1, wherein said apparatus is a force gauge.

26. Apparatus as recited in claim 1, wherein said apparatus measures humidity.

27. Apparatus as recited in claim 1, wherein said apparatus is a mechanical actuator.

28. Apparatus as recited in claim 1, wherein said apparatus is a hall effect sensor.

29. Apparatus as recited in claim 1, wherein said apparatus is a vacuum gauge.

* * * * *